(12) United States Patent
Guey et al.

(10) Patent No.: US 8,990,031 B2
(45) Date of Patent: Mar. 24, 2015

(54) TORSIONAL RESONANCE FREQUENCY MEASURING DEVICE AND METHOD

(75) Inventors: Zen-Jey Guey, Hsinchu (TW); Yun-Yuan Chang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 626 days.

(21) Appl. No.: 12/777,311

(22) Filed: May 11, 2010

(65) Prior Publication Data

US 2011/0144929 A1 Jun. 16, 2011

(30) Foreign Application Priority Data

Dec. 10, 2009 (TW) ................................ 98142228 A

(51) Int. Cl.
*G01L 7/00* (2006.01)
*G01H 13/00* (2006.01)
(52) U.S. Cl.
CPC ................................... *G01H 13/00* (2013.01)
USPC .......................................................... 702/56
(58) Field of Classification Search
CPC ................................. G01H 1/003; G01H 1/00
USPC .......................................................... 702/56
See application file for complete search history.

(56) References Cited

U.S. PATENT DOCUMENTS

| | | | |
|---|---|---|---|
| 4,751,437 A | 6/1988 | Gerard | |
| 4,793,186 A | 12/1988 | Hurley | |
| 4,843,292 A | 6/1989 | Ono et al. | |
| 5,350,987 A * | 9/1994 | Ueki | 318/466 |
| 5,392,656 A * | 2/1995 | Lew et al. | 73/861.354 |
| 5,495,158 A | 2/1996 | Schmidt et al. | |
| 5,689,169 A | 11/1997 | Kerkman et al. | |
| 5,811,949 A | 9/1998 | Garces | |
| 5,834,918 A | 11/1998 | Taylor et al. | |
| 5,929,400 A | 7/1999 | Colby et al. | |
| 5,965,995 A | 10/1999 | Seibel et al. | |
| 6,034,493 A | 3/2000 | Boyd et al. | |

(Continued)

FOREIGN PATENT DOCUMENTS

DE 000002734396 A1 2/1979
EP 0913694 A1 5/1999

(Continued)

OTHER PUBLICATIONS

English Abstract of ES 2343559, Aug. 2010.*

(Continued)

*Primary Examiner* — Michael Nghiem
(74) *Attorney, Agent, or Firm* — Rabin & Berdo, P.C.

(57) ABSTRACT

The invention provides a torsional resonance frequency measuring device and method applicable to a large-scale power generating equipment or a traction motor equipment with a rotating shaft, such as a large power grid-tied wind turbine. The invention is characterized by employing a machine-side converter existing in the grid-tied wind turbine to output direct currents to a three-phase PMSG (permanent magnet synchronous generator), such that a pulse torque is generated to mechanically excite a rotor of the three-phase PMSG. Afterwards, a control circuit of the machine-side converter acquires back electromotive force generated by the mechanically excited rotor so as to calculate the torsional resonance frequency of the overall drive-chain system according to the frequency spectrum of the back electromotive force.

19 Claims, 7 Drawing Sheets

(56) References Cited

U.S. PATENT DOCUMENTS

| | | |
|---|---|---|
| 6,242,885 B1 * | 6/2001 | Ide et al. .................. 318/811 |
| 6,316,904 B1 | 11/2001 | Semenov et al. |
| 6,414,455 B1 | 7/2002 | Watson |
| 6,421,615 B1 | 7/2002 | Nakajima et al. |
| 6,498,417 B2 | 12/2002 | Fuller |
| 6,622,099 B2 | 9/2003 | Cohen et al. |
| 6,798,082 B1 | 9/2004 | Chen |
| 7,317,998 B2 * | 1/2008 | Lacaze et al. ............... 702/76 |
| 2005/0193821 A1 | 9/2005 | Hurley et al. |
| 2005/0222787 A1 * | 10/2005 | Lacaze et al. ............... 702/76 |
| 2008/0106224 A1 * | 5/2008 | Fu et al. .................. 318/139 |
| 2008/0245159 A1 * | 10/2008 | Garshelis et al. ......... 73/862.27 |
| 2009/0001831 A1 * | 1/2009 | Cho et al. .................. 310/112 |
| 2010/0109328 A1 * | 5/2010 | Li et al. .................... 290/44 |
| 2011/0115424 A1 * | 5/2011 | Vilain et al. ................ 318/721 |

FOREIGN PATENT DOCUMENTS

| | | |
|---|---|---|
| EP | 2073375 A1 | 6/2009 |
| JP | 2004053383 A | 2/2004 |
| JP | 2008082879 A | 4/2008 |
| JP | 2010136523 * | 6/2010 |
| WO | WO-2008137836 A1 | 11/2008 |

OTHER PUBLICATIONS

English Abstract of JP 2010136523, Jun. 2010.*
German Patent Office, Office Action, Patent Application Serial No. 102010019732.7, Sep. 6, 2013, German.

* cited by examiner

TORSIONAL RESONANCE FREQUENCY MEASURING DEVICE AND METHOD

TECHNICAL BACKGROUND

1. Technical Field

The present invention relates generally to torsional resonance frequency measuring devices and methods applied to rotating members, and more particularly, to a device and method that measures the torsional resonance frequency of a rotating member supported in an unrestrained free-free drive-chain through impact excitation by using a machine-side converter.

2. Description of Related Art

In recent years, due to the depletion of fossil fuel and environment concerns, a lot of countries have focused on developing wind power generation. In order to generate electric power, the wind turbines have rotating blades driven by the wind, which convert the wind power to the mechanical power, and the mechanical power is then converted into electrical energy by an electrical generator, and finally, the electrical energy is transformed into an appropriate form by a power converter and fed to loads such as road lights, energy storage devices such as batteries, or a power transmission and distribution system. Generally, wind turbines that feed electrical energy to loads and energy storage devices are described as non grid-tied wind turbines and wind turbines that feed electrical energy to power transmission and distribution systems are described as grid-tied wind turbines. Most of the current large-scale wind turbines are grid-tied wind turbines.

Since wind turbines in operation must bear wind loads with randomness and turbulence, they are often subject to vibration and noise problems. When rotational machines are applied to large-scale power generators or traction motor equipments (such as large power grid-tied wind turbines), torsional vibration along the drive-chain is a major factor causing element damage and noise. Therefore, how to suppress vibration and noise of wind turbines has become an important topic.

In view of the above potential problems, the torsional resonance frequency of a wind turbine should be obtained for determining the operation state of the wind turbine. There are various torsional resonance frequency measuring methods and devices in the art. Generally, two ends of a transmission shaft (rotor) for a wind turbine are supported in an unrestrained free-free manner during normal operation. The torsional resonance frequency of such a wind turbine is usually measured through impact excitation, torsional shaker excitation, running at variable frequencies and so on, wherein the method of impact excitation is very simple and rapid and is most widely used.

FIG. 1 is a diagram showing the conventional impact excitation method for measuring the torsional resonance frequency of a drive-chain. Referring to FIG. 1, the method uses a signal analyzer 1, an accelerometer 2 and a hammer 3. To measure the torsional resonance frequency of a drive-chain, a transmission shaft 5 of a permanent magnet synchronous generator (PMSG) is struck by the hammer 3 to generate impulse torque, and vibration signals are picked up by the accelerometer 2, and signals outputted from the hammer 3 and the accelerometer 2 are sampled and calculated through the signal analyzer 1 to find the torsion resonance frequency of the drive-chain.

However, there are some drawbacks in using such an impact excitation method. For example, in the measurement of the drive-chains of the wind turbines, precision inspection instruments and measuring tools, such as the accelerometer and the hammer, need to be transported or carried by maintenance staff to the site where a wind turbine is located, and the transmission shaft of a power generator needs to be hit by the hammer to generate impulse torque. However, since large-scale wind turbines are usually installed at higher places, and most of the wind turbines or wind capturing devices are generally installed on remote mountains, seaside or even offshore islands for achieving preferred wind capture effect and avoiding noise pollution, to make on-site measurement results in high cost and wasting of time. Further, wind turbines high above the ground pose a potential safety risk to on-site maintenance staff.

Therefore, it is worthwhile to provide a torsional resonance frequency measuring device and method with high efficiency, high safety and low cost.

SUMMARY

In view of the above potential problems, the present invention provides a torsional resonance frequency measuring device and method applicable to a large-scale power generator or traction motor equipment with a rotating member, such as a large power grid-tied wind turbine, which can use the existing hardware structure of the wind turbine to measure the torsional resonance frequency so as to dispense with on-site measurement by maintenance staff, thereby reducing the cost for parameter adjustment and equipment diagnosis and prognosis, and greatly increasing the maintenance efficiency and operation safety for maintenance staff.

Accordingly, the present invention provides a torsional resonance frequency measuring device applicable to a power equipment with a rotating member, which comprises: a three-phase permanent magnet synchronous generator (PMSG); and a machine-side converter connected to a three-phase PMSG, a control unit which first commands the machine-side converter to output stator currents in a specific pattern to rotate the rotor of the PMSG to a predetermined orientation, and subsequently commands the machine-side converter to output stator currents in another pattern via two phase windings to apply a pulse torque to mechanically excite the rotor of the PMSG; and then the control unit acquires the back electromotive force (back-emf) generated on the remaining phase winding of the PMSG. The back-emf data are thus calculated by using FFT algorithm to obtain the torsional resonance frequency of a power equipment with the rotating member according to a frequency spectrum of the back electromotive force.

The present invention further provides a torsional resonance frequency measuring method applicable to a power equipment with a rotating member, which acquires the torsional resonance frequency of the power equipment through interaction of a machine-side converter and a rotor of a three-phase PMSG. The method comprises: (1) establishing a DC link voltage required by the machine-side converter; (2) the machine-side converter outputting three-phase currents to the three-phase PMSG so as to rotate the rotor to a predetermined orientation; (3) the machine-side converter outputting pulse currents to the three-phase PMSG so as to mechanically excite the rotor; and (4) acquiring the back emf generated by the mechanically excited rotor and calculating a torsional resonance frequency of the power equipment according to a frequency spectrum of the back electromotive force.

Therefore, the torsional resonance frequency device and method of the present invention implements real-time remote equipment measurement and diagnosis so as to save time and cost and increase operation safety for maintenance staff.

DETAILED DESCRIPTION OF PREFERRED EMBODIMENTS

Figure 1:
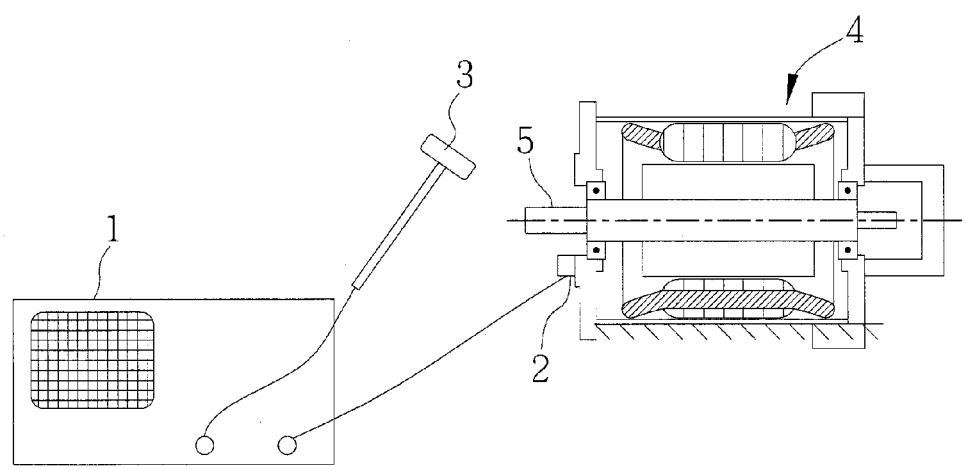
FIG. 1 is a diagram showing a conventional impact excitation method for measuring the torsional resonance frequency of a drive-chain.

The following illustrative embodiments are provided to illustrate the disclosure of the present invention, these and other advantages and effects can be apparent to those in the art after reading this specification.

To make the present invention more clear, detailed description of conventional electrical connections (such as power sources and voltage signals), coupling methods and basic circuit elements (such as capacitors and diodes) is omitted herein.

The present invention provides a torsional resonance frequency measuring device and method applicable to a rotary electric machine such as a large-scale power generator or traction motor equipment such as a large power grid-tied wind turbine. In the following embodiments of the present invention, a grid-tied wind turbine is exemplified as a rotary motor and the embodiments are detailed based on the grid-tied wind turbine.

Further, same or similar elements in the embodiments are denoted as the same reference numerals in the drawings to make the description more clear.

Figure 2:
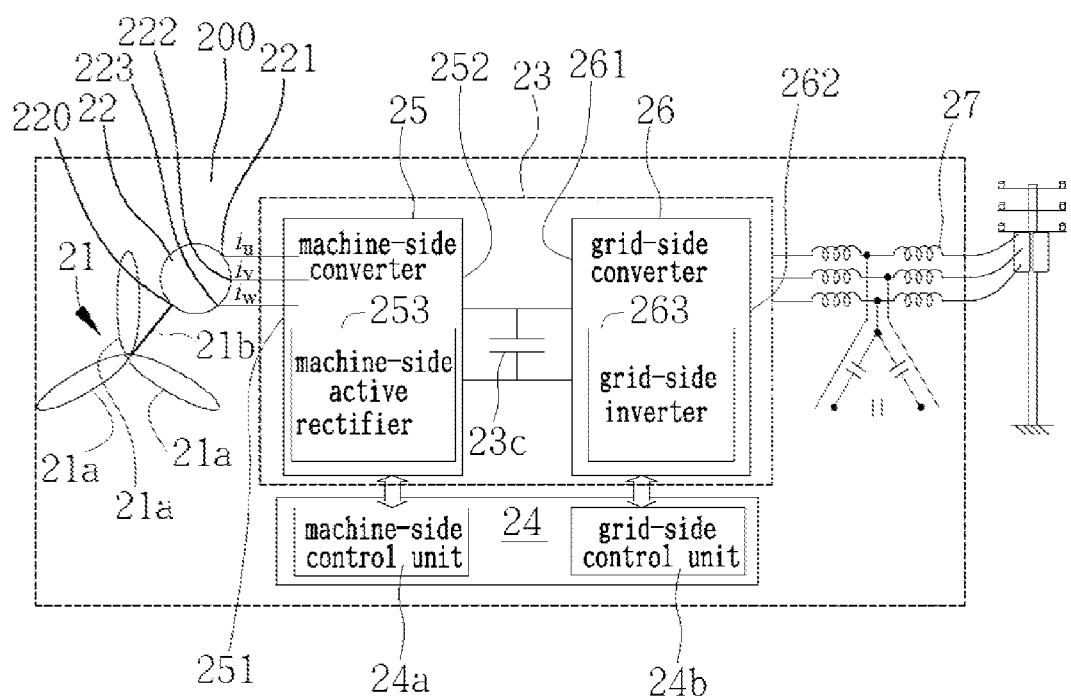
FIG. 2 is a diagram showing a wind turbine comprised of a three-phase PMSG (permanent magnet synchronous generator) and a grid-tied power converter.

FIG. 2 is a diagram of a wind turbine 200 mainly comprised of a three-phase PMSG (permanent magnet synchronous generator) 22 and a grid-tied power converter 23. As shown in FIG. 2, the wind turbine 200 comprises a rotating member 21, a three-phase PMSG 22, a grid-tied power converter 23, a control unit 24 and a grid 27. The rotating member 21 can be a drive-chain of a large-scale generator or traction motor equipment (such as a large power grid-tied wind turbine). The large-scale generator or traction motor equipment has a transmission mechanism for bringing the rotating member 21 to rotate, and the transmission mechanism is supported in an unrestrained free manner. For example, the rotating member 21 can be a wind turbine impeller comprised of a plurality of blades 21a, and the transmission mechanism can be a rotating shaft 21b.

It should be noted that the three-phase PMSG 22 can operate both in a generator mode for converting mechanical energy to electrical energy and in a motor mode for converting electrical energy to mechanical energy.

The three-phase PMSG 22 comprises a three-phase stator winding which includes a first-phase stator winding 221, a second-phase stator winding 222 and a third-phase stator winding 223, and a rotor 220.

Figure 3A:
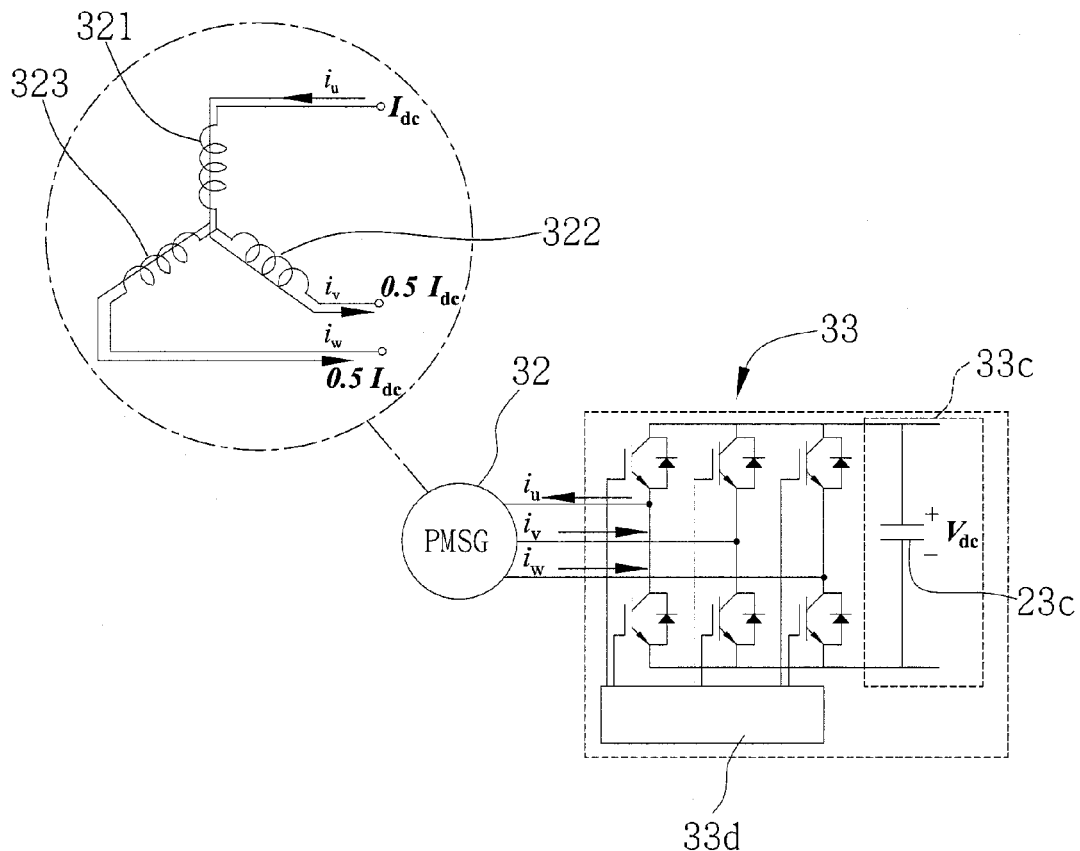
FIG. 3A is a diagram showing orientation of a rotor of the three-phase PMSG by a torsional resonance frequency measuring device of the present invention.

The grid-tied power converter 23 comprises a machine-side converter 25 with an Alternating Current/Direct Current (AC/DC) structure, a grid-side converter 26 with a DC/AC structure, and a capacitor device 23c that has a DC voltage storage function for establishing a DC link voltage (as 33c in FIG. 3A).

Therein, the machine-side converter 25 has an AC terminal 251 for outputting or receiving AC current (voltage), a DC terminal 252 for outputting or receiving DC voltage (current), and a machine-side active rectifier 253. The grid-side converter 26 has a DC terminal 261 for outputting or receiving DC voltage (current), an AC terminal 262 for outputting or receiving AC current (voltage) and a grid-side inverter 263. The DC terminal 251 is coupled with the three-phase stator winding of the three-phase PMSG 22, in which the three-phase stator includes currents $i_u$, $i_v$ and $i_w$; the DC terminal 252 of the machine-side converter and the DC terminal of the grid-side converter 261 are both coupled with the same DC link (as 33c in FIG. 3A). The machine-side active rectifier 25 is coupled with the control circuit 24. The AC terminal 262 of the grid-side converter is coupled with the grid 27 for outputting AC power to the grid 27 or receiving AC power from the grid 27; and the grid-side inverter 263 is controlled by the control circuit 24.

It should be noted that the machine-side active rectifier 253 not only has a function to covert AC to DC but also can have a function to convert DC to AC according to the practical need. In other words, the machine-side active rectifier 253 can provide the function of the inverter if necessary (i.e., the function of converting DC to AC).

For example, in the present embodiment, DC voltage supplied to the DC terminal 252 through the DC link can be converted by the machine-side active rectifier 253 so as to output AC voltage through the AC terminal 251.

The control unit 24 has a machine-side control unit 24a for controlling the machine-side active rectifier 253 and a grid-side control unit 24b for controlling the grid-side inverter 263. Accordingly, the control unit 24 can drive three-phase power electronic elements through the machine-side active rectifier 253 and the grid-side inverter 263, thereby controlling output current of the grid-tied power converter 23 and receiving and sensing current (voltage) received by the grid-tied power converter 23. That is, the control unit 24 can control current outputted from the machine-side converter 25 to the three-phase PMSG 22, and can also sense three-phase current value received by the machine-side converter 25 or sense terminal voltage value of the three-phase stator windings through the machine-side converter 25.

FIG. 3A is a diagram showing orientation of the rotor of the three-phase PMSG 32 through a torsional resonance frequency measuring device 300 of the present invention. Referring to FIG. 3A, the three-phase PMSG 32 comprises a three-phase stator windings including a first-phase stator wind it 321, a second-phase stator winding 322 and a third-phase stator winding 323, and a DC link voltage $V_{dc}$ is established first. Various methods can be used for establishing $V_{dc}$. For example, the grid-side converter 26 can be connected to the grid 27 so as to supply the DC link voltage $V_{dc}$; or a DC power supplier can be connected to the DC link 33c for establishing the DC link voltage $V_{dc}$; or a rechargeable battery set can be used for supplying the DC link voltage $V_{dc}$.

Figure 3B:
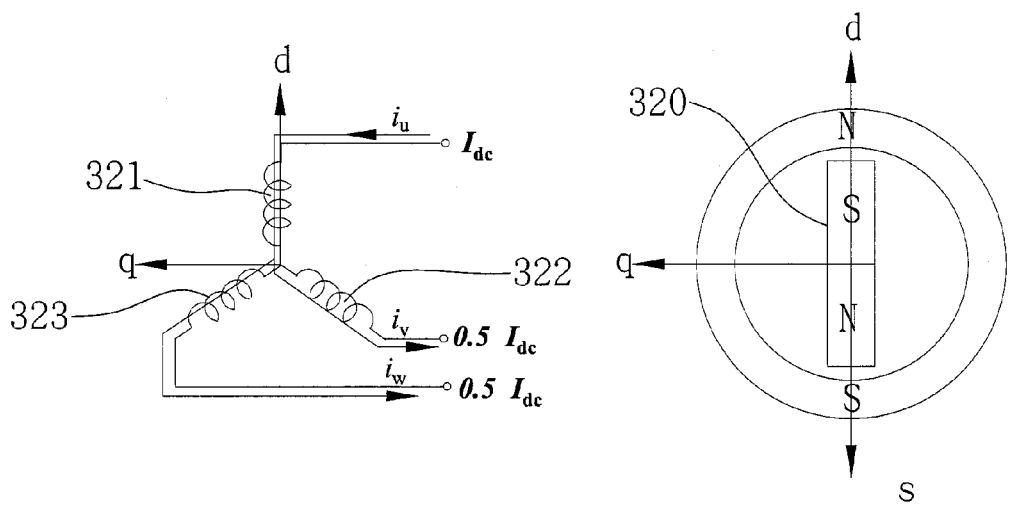
FIG. 3B is a diagram showing the direction of magnetic fields of rotor and stator windings of the three-phase PMSG of FIG. 3A.

Subsequently, a machine-side converter 33 drives three-phase power electronic elements such as IGBTs through a machine-side active rectifier 33d so as to output orienting currents meeting the equations: $i_u=I_{dc}$, $i_v=-0.5 \cdot I_{dc}$, $i_w=-0.5 \cdot I_{dc}$. After a certain duration, a rotor of the three-phase PMSG 32 is aligned and oriented. Therein, $L_c$ can be adjusted according to the specification of the three-phase PMSG. The orienting currents generate a magnetic field $\Psi_s$ on the three-phase stator windings of the three-phase PMSG 32, as shown in FIG. 3B.

FIG. 39 is a diagram showing the direction of magnetic fields of the rotor 320 and stator windings of the three-phase PMSG of FIG. 3A. As described above, the orienting currents that meet the equations $i_u=I_{dc}$, $i_v=-0.5 \cdot I_{dc}$, $i_w=-0.5 \cdot I_{dc}$ are outputted from the machine-side converter 33 to the three-phase stator windings so as to generate the magnetic field $\psi_s$ on the three-phase stator windings, thereby rotating the rotor 320. In the present embodiment, when the orienting currents reach a stable state after a certain duration, the permanent magnet of the rotor 320 of the three-phase PMSG 32 rotates to a position. aligned with d-axis under the influence of the stator magnetic field $\psi_s$. As shown in FIG. 3B, the d-axis (direct axis) corresponds to the radial direction of the u-phase stator winding and q-axis (quadrature axis) corresponds to the radial direction 90 electrical degrees ahead of the d-axis.

After the rotor 320 of the three-phase PMSG 32 is aligned with the d-axis, the machine-side converter 33 sets currents at a u-phase terminal, a v-phase terminal and a w-phase terminal to zero, i.e. $i_u=0$, $i_v=0$, $i_w=0$. Thereafter, pulse currents are outputted through the machine-side converter 33 to the three-phase PMSG 32 so as to mechanically excite the rotor 320 of the three-phase PMSG 32.

Figure 4A:
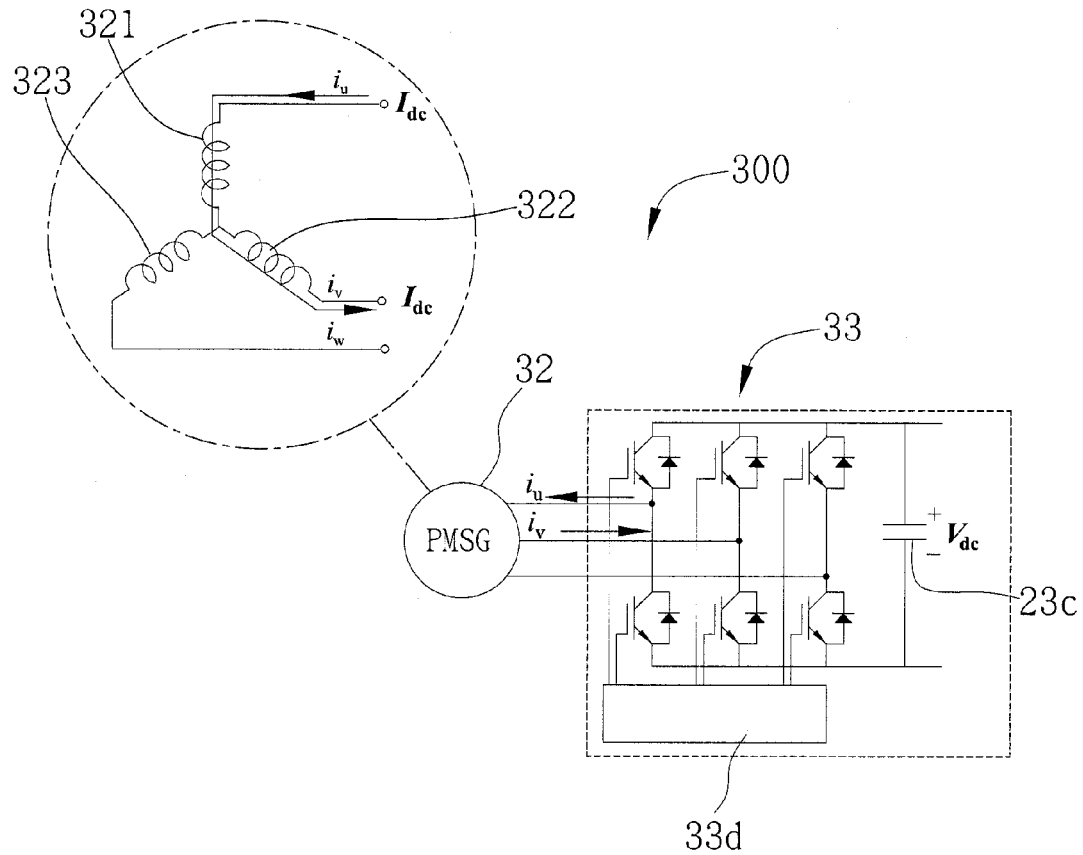
FIG. 4A is a diagram showing excitation of the rotor of the three-phase PMSG by the torsional resonance frequency measuring device of the present invention.

FIG. 4A is a diagram showing excitation of the rotor of the three-phase PMSG 32 by the torsional resonance frequency measuring device 300 of the present invention. Referring to FIG. 4A, the three-phase power electronic elements of the machine-side converter 33 are driven through the machine-side active rectifier 33d so as to output Pulse currents to the three-phase stator windings of the three-phase PMSG 32, the Pulse currents meeting the equations: $i_u=I_{dc}$, $i_v=-0.5 \cdot I_{dc}$, $i_w=0$. That is, the w-phase power electronic elements of the upper and lower arms of the machine-side converter 33 are kept at off state. The pulse duration time is 5% less than the mechanical time constant ($\tau_m$) of the three-phase PMSG 32. The Pulse current generates a pulse torque similar to an impact excitation effect generated by a hammer in the prior art. That is, the Pulse current generates a pulse magnetic field $\Psi_s'$ on the three-phase stator windings of the three-phase PMSG 32, as shown in FIG. 4B.

Figure 4B:
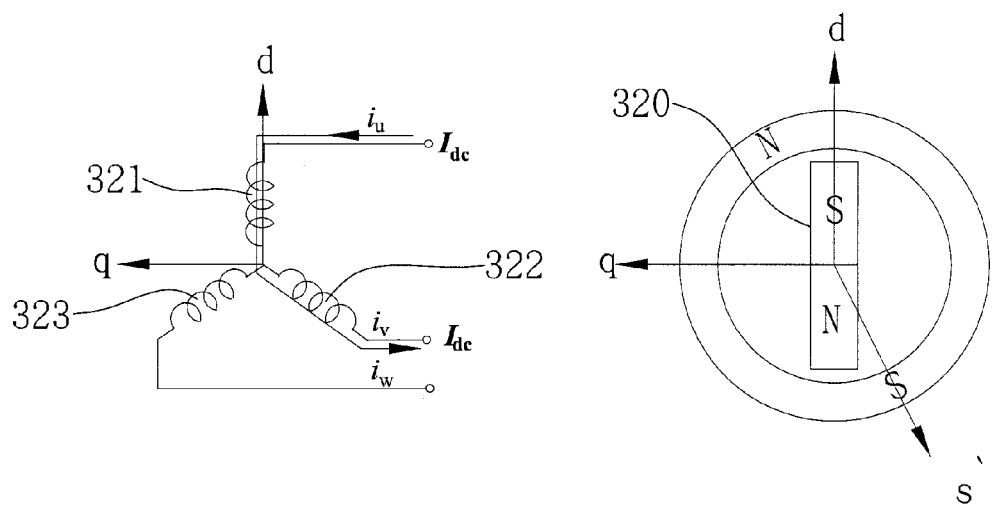
FIG. 4B is a diagram showing the direction of magnetic fields of the rotor and stator windings of the three-phase PMSG of FIG. 4A.

FIG. 4B is a diagram showing the direction of magnetic fields of the rotor 320 and stator windings of the three-phase PMSG 32 of FIG. 4A. As described above, the Pulse currents are outputted from the machine-side converter 33 to the three-phase stator windings of the three-phase PMSG 32 so as to generate the pulse magnetic field $\psi_s'$ the pulse magnetic field $\psi_s'$ producing a pulse torque. In the pulse duraiion, the magnet of the rotor 320 of the three-phase PMSG 32 twists and wobbles under the influence of the pulse magnetic field $\psi_s'$ and due to the dynamic characteristic of the transmission shaft. The pulse torque is equivalent to a pulse torque generated by the hammer 3 of FIG. 1, and the resonance frequency can also be measured through an accelerometer.

In the present embodiment, a predetermined torque constant of the three-phase PMSG 32 is $K_T$(Nm/$A_{peak}$). Meanwhile, since the pulse duration is quite short and the range of mechanically excited angle displacement of the rotor 320 is extremely small, the angle between the pulse magnetic field $\psi_s'$ and the rotor 320 can be assumed to be 120 electrical degrees. The equivalent amplitude of the three-phase currents is $$\frac{2}{\sqrt{3}} \cdot I_{dc}.$$

The amplitude of the pulse torque ($T_{pulse}$) is $$T_{pulse} = K_T \times \sin(120°) \times \frac{2}{\sqrt{3}} \cdot I_{dc} = K_T \times I_{dc}$$

Since the Pulse currents only flow through the u-phase and v-phase stator windings and no current flows through the w-phase stator winding, the w-phase stator winding can be used as a search coil for measurement of back electromotive force $e_W(t)$ generated by the mechanically excited rotor. $e_W(t)$ is represented by the following equation.

$$e_W(t) = -\frac{d\lambda_{PM\_W}}{dt}$$
$$= \frac{d(\lambda_{PM} \cdot \cos\theta)}{dt}\bigg|_{\theta=120°}$$
$$= \frac{d(N_{re} \cdot \phi_{PM} \cdot \cos(\theta))}{dt}\bigg|_{\theta=120°}$$
$$= \frac{\sqrt{3}}{2} N_{re} \cdot \phi_{PM} \cdot \omega(t)$$

Therein, $N_{re}$ represents the effective number of turns of the stator windings, $\phi_{PM}$ represents the air-gap flux density produced by the rotor magnet, $\lambda_{PM\_W}$ is the rotor flux chain of the w-phase stator winding, and $\omega(t)$ is the instant rotation speed of the rotor.

Figure 5:
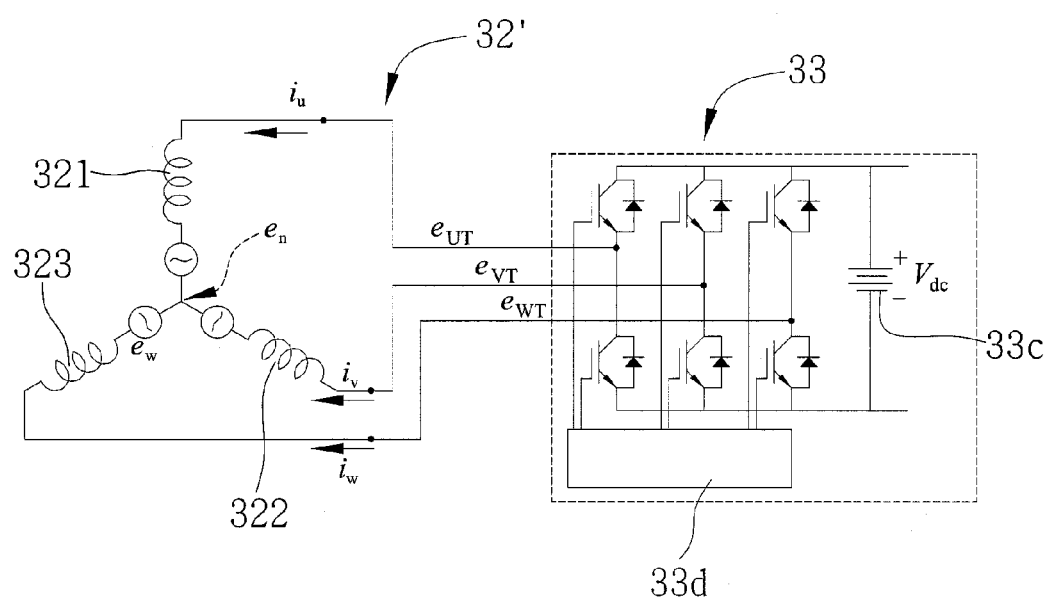
FIG. 5 is a diagram showing measurement of back electromotive force generated by the three-phase PMSG through the torsional resonance frequency measuring device of the present invention.

FIG. 5 is a diagram showing measurement of back electromotive force generated by a three-phase PMSG 32', which comprises a first-phase stator winding 321, a second-phase stator winding 322 and a third-phase stator winding 323, through the torsional resonance frequency measuring device of the present invention. After the torsional resonance frequency measuring device 300 mechanically excites the three-phase PMSG 32', back electromotive force generated on the w-phase stator winding of the PMSG 32' can be acquired through the machine-side converter 33. The machine-side converter 33 is coupled with the u-phase, v-phase and w-phase stator windings to provide three-phase pulse width modulation conversion and also has a current closed loop control function. Further, the machine-side converter 33 can measure terminal voltages ($e_{UT}$, $e_{VT}$ and $e_{WT}$) of the three-phase stator windings of the three-phase PMSG 32'. $e_{UT}$, $e_{VT}$ and $e_{WT}$ are terminal voltages at coupling positions of the machine-side converter 33 and the three-phase stator windings of the PMSG 32' relative to the negative terminal of the DC link. The voltage of the neutral point of the three-phase stator windings is $$e_n = \frac{1}{3}(e_{UT} + e_{VT} + e_{WT}). \text{ Since } i_W = 0,$$

Since $i_W=0$, voltage drop does not occur to the w-phase stator winding. Therefore, the back electromotive force on the w-phase stator winding can be calculated according to measured $e_{UT}$, $e_{VT}$ and $e_{WT}$. The equation is as follows.

$$e_W = e_{WT} - e_n = \frac{2}{3}e_{WT} - \frac{1}{3}e_{UT} - \frac{1}{3}e_{VT}$$

The orienting currents and pulse currents of the u-phase and v-phase stator windings can be controlled by the control unit 24 of FIG. 2 (not shown in FIG. 5). Time-series data of the pulse current $i_u$ (or $i_v$) and the back electromotive force $e_W(t)$ can be sampled and collected and further analyzed in the frequency domain. Since the pulse current $i_u$ of the u-phase stator winding is positively proportional to the pulse torque applied on the rotor and the back electromotive force $e_W(t)$ on the w-phase stator winding is positively proportional to the rotation speed response of the rotor, through FFT (Fast Fourier Transform) analysis of the time-series data by the control unit, a frequency spectrum of the time-series data can be obtained so as to find the torsional resonance frequency of the transmission shaft (i.e. the rotating member 21).

Figure 6A:
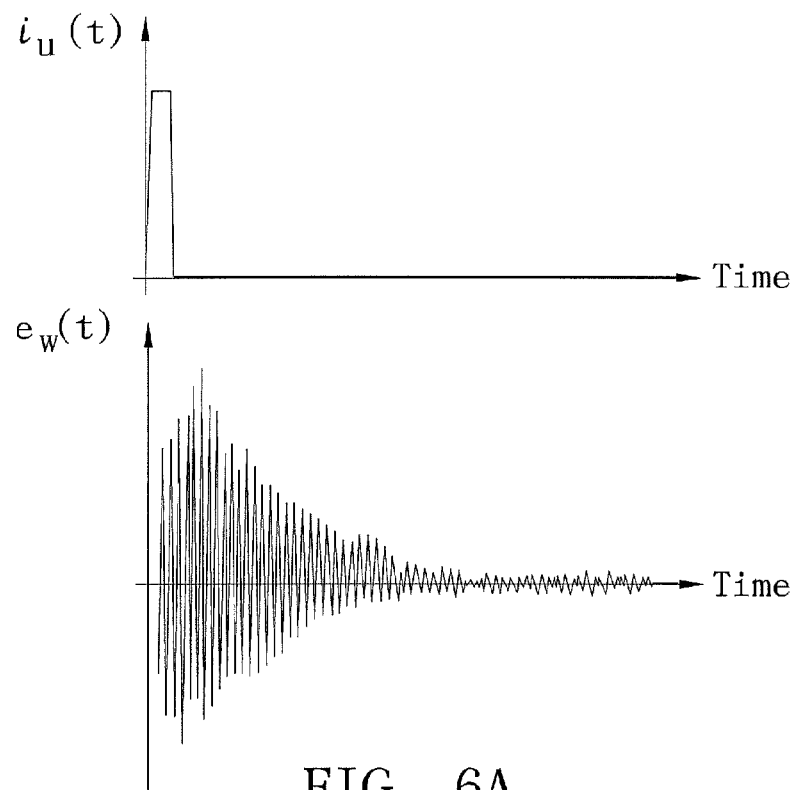
FIG. 6A is a time-domain waveform of the pulse current outputted from u-phase terminal to v-phase terminal of the torsional resonance frequency measuring device of the present invention and back electromotive force of w-phase stator winding of the three-phase PMSG.
Figure 6B:
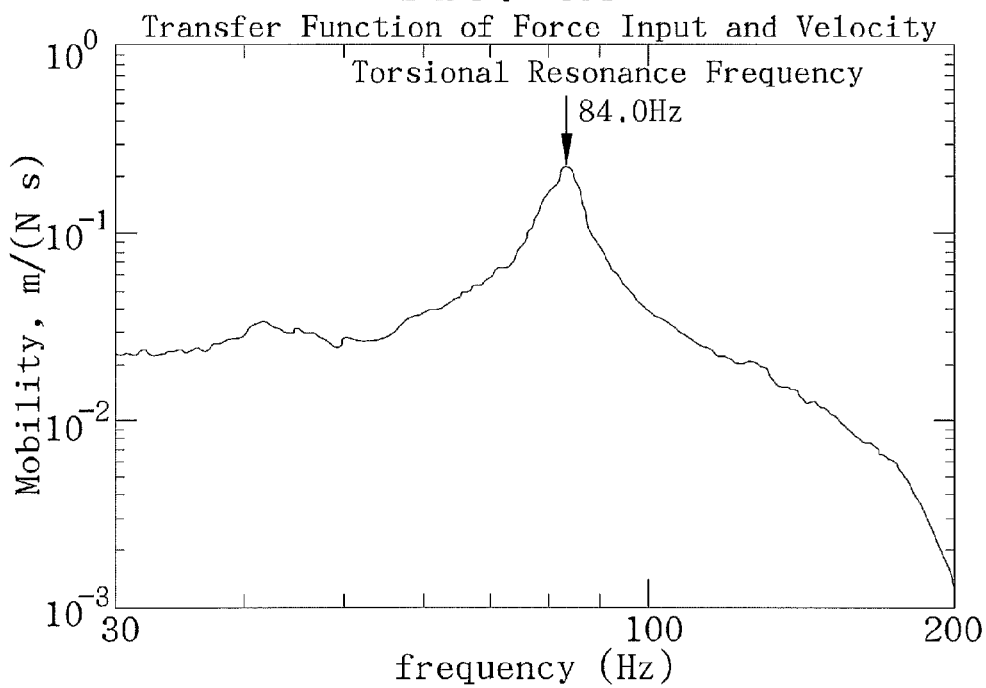
FIG. 6B is a frequency spectrum of FIG. 6A.

FIGS. 6A and 6B show measuring results of the torsional resonance frequency measuring device of the present invention, wherein FIG. 6A is the time-domain waveform of the pulse current $i_u(t)$ outputted from the u-phase terminal to v-phase terminal and the back electromotive force $e_W(t)$ on the w-phase stator winding, and FIG. 6B is a frequency spectrum of the time-series data of FIG. 6A using such as FFT calculation. The peak value in the frequency spectrum corresponds to the torsional resonance frequency of the rotating member, which is 84.0 Hz in the present embodiment.

Figure 7:
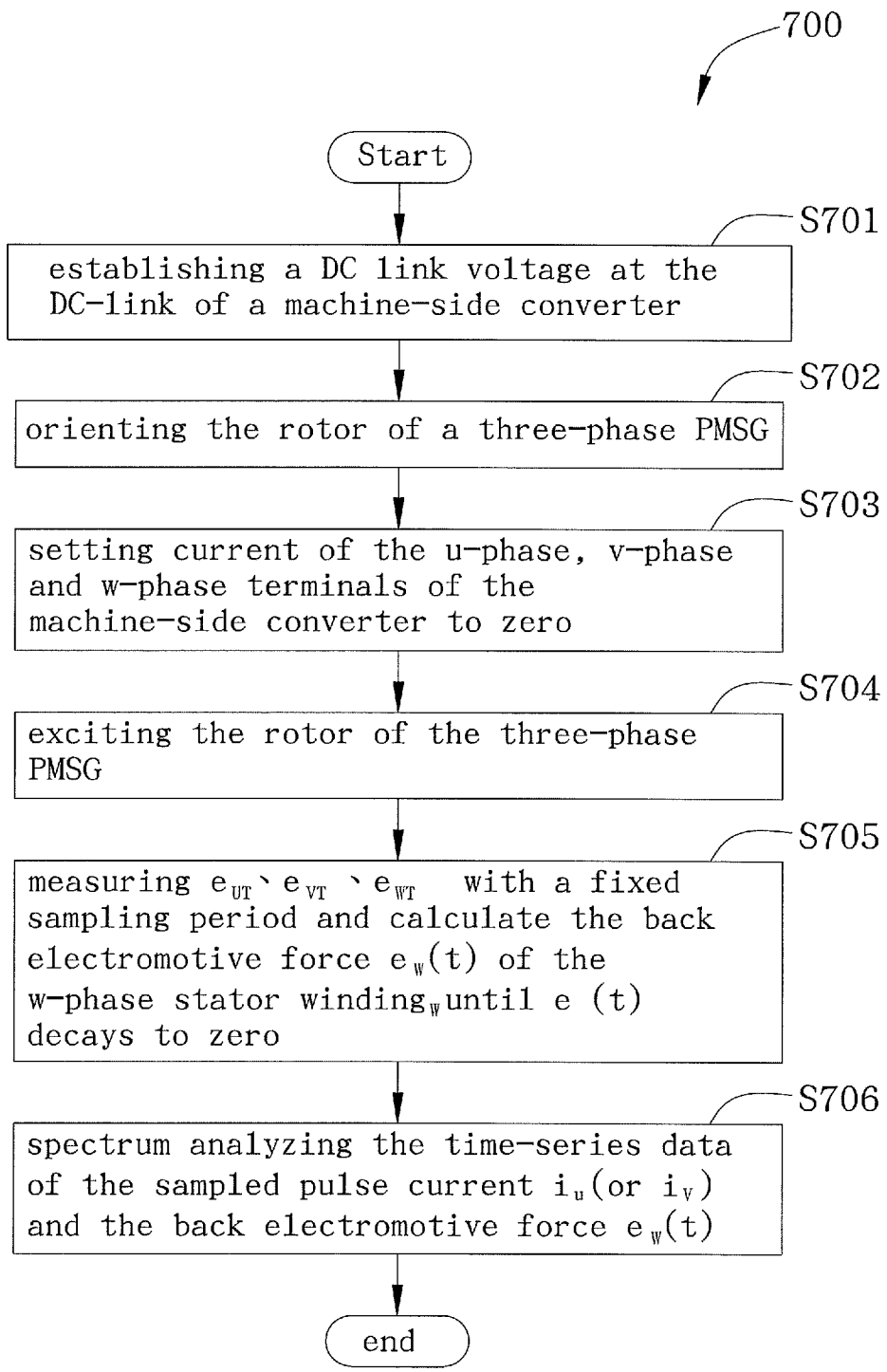
FIG. 7 is a flow diagram showing a torsional resonance frequency measuring method of the present invention.

FIG. 7 is a flow diagram showing a torsional resonance frequency measuring method of the present invention. Referring to FIG. 7, first, at step S701, a DC link voltage is established at the DC-link of a machine-side converter. Then, the process goes to step S702.

At step S702, currents of the u-phase, v-phase and w-phase stator windings of a three-phase PMSG are controlled so as to rotate the magnet of the rotor of the three-phase PMSG to a position in parallel to the radial direction of one of the u-phase, v-phase and w-phase stator windings. In particular, the currents and pulse duration meet the equations: $i_u=I_{dd}$, $i_v=i_w=-0.5 I_{dc}$, and $T_{dc} \geq \tau_m$, such that the rotor magnet of the three-phase PMSG is aligned with and oriented to the d-axis. Then, the process goes to step S703.

At step S703, the orienting currents of the u-phase, v-phase and w-phase terminals of the machine-side converter are set to zero; that is, the machine-side converter comes into a current closed loop control mode, wherein $i_u=i_v=i_w=0$. Then, the process goes to step S704.

At step S704, Pulse currents are outputted to the u-phase and v-phase stator windings through the u-phase and v-phase terminals, respectively. That is, $i_u=I_{dc}$, $i_v=-I_{dc}$, $i_w=0$, and the pulse duration is $T_p \leq 0.05 \tau_m$, thereby providing a pulse torque to the rotor. Then, the process goes to step S705.

At step S705, terminal voltages of the u-phase, v-phase and w-phase stator windings are acquired, that is, $e_{UT}$, $e_{VT}$, $e_{WT}$ are continuously measured with a fixed sampling period ($T_s \leq 50$ μs) and the back electromotive force $e_W(t)$ of the w-phase stator winding is calculated until $e_W(t)$ decays to zero. Then, the process goes to step S706.

At step S706, the time-series data of the sampled pulse current $i_u$ (or $i_v$) and the back electromotive force $e_W(t)$ are sampled and analyzed so as to obtain a frequency spectrum, the frequency corresponding to the peak value in the frequency spectrum being the torsional resonance frequency of the rotating member. Thus, the process is completed.

The present invention use an existing power converter structure in a power equipment for measuring the torsional resonance frequency of the power equipment, thereby providing a more cost-effective solution compared with the prior art. Further, the torsional resonance frequency device and method of the present invention implement real-time remote equipment measurement so as to dispense with on-site measurement, thereby saving time and cost for measurement, increasing the efficiency and facilitating equipment maintenance.

The foregoing descriptions of the detailed embodiments are only to illustrate the preferred implementation according to the present invention, and it is not to limit the scope of the present invention. Accordingly, all modifications and variations completed by those with ordinary skill in the art should fall within the scope of present invention defined by the appended claims.

What is claimed is:

1. A torsional resonance frequency measuring device, comprising:
    a power equipment with a rotating member;
    a three-phase permanent magnet synchronous generator (PMSG) having a three-phase stator winding and a rotor, the three-phase stator winding including a first-phase stator winding, a second-phase stator winding and a third-phase stator winding;
    a control unit; and
    a machine-side converter connected to the three-phase stator winding, the machine-side converter further being connected to the control unit,
    wherein the control unit controls the machine-side converter to
        first, output orienting currents for orienting the rotor of the three-phase PMSG, so as to rotate the rotor to a position aligned with a radial direction of the first phase stator winding, through a magnetic field generated by the orienting currents,
        then after the rotor is rotated to the position aligned with the radial direction, set the orienting currents to zero, and
        after the orienting currents are set to zero, subsequently output pulse currents to the first-phase stator winding and the second-phase stator winding, so as to generate by the pulse currents a pulse magnetic field with a predetermined angle, thereby producing a pulse torque for mechanically exciting the rotor;
    wherein the control unit acquires back electromotive force generated on the third-phase stator winding of the three-phase stator winding due to the mechanical excitation of the rotor so as to calculate a torsional resonance frequency of the power equipment with the rotating member according to a frequency spectrum of the back electromotive force,
    wherein the orienting currents are output such that a current of the first-phase stator winding is $I_{dc}$, a current of the second-phase stator winding is $-0.5 \cdot I_{dc}$ and a current of the third-phase stator winding is $-0.5 \cdot I_{dc}$, further wherein the pulse currents are output so that the current of the first-phase stator winding is $I_{dc}$, the current of the second-phase stator winding is $-0.5 \cdot I_{dc}$ and the current of the third-phase stator winding is zero, and further wherein $I_{dc}$ is determined according to a specification of the three-phase PMSG.

2. The device of claim 1, wherein the rotating member and the three-phase PMSG are supported in an unrestrained free-free manner.

3. The device of claim 1, wherein the rotating member is an impeller of a wind turbine.

4. The device of claim 1, wherein the machine-side converter has a current closed-loop control function for the three-phase stator winding.

5. The device of claim 1, further comprising a DC link circuit having one terminal coupled with the machine-side converter so as to provide a required DC voltage level for normal operation of the machine-side converter.

6. The device of claim 5, further comprising a grid-side converter, wherein another terminal of the DC link circuit is coupled with the grid-side converter such that electric power generated by the three-phase PMSG can be fed through the grid-side converter to a grid.

7. The device of claim 1, wherein the power equipment with the rotating member is a wind turbine.

8. The device of claim 1, wherein the back electromotive force is calculated and analyzed using a FFT (Fast Fourier Transform) algorithm by the control unit so as to obtain the torsional resonance frequency of the power equipment with the rotating member.

9. The device of claim 8, wherein the torsional resonance frequency is obtained through FFT based on a first-phase or second-phase pulse current and the back electromotive force on the third-phase stator winding.

10. The device of claim 9, wherein no current flows through the third-phase stator winding, and the third-phase stator winding is used as a search coil for measurement of the back electromotive force.

11. The device of claim 1, wherein the machine-side converter has a first-phase terminal, a second-phase terminal, and a third-phase current terminal, and acquires a terminal voltage of the third-phase stator winding of the three-phase PMSG through the third-phase current terminal, so as to obtain the back electromotive force on the third-phase stator winding.

12. The device of claim 1, wherein the control unit has a machine-side control unit and a grid-side control unit.

13. The device of claim 12, further comprising a grid-side converter, wherein the machine-side converter includes a machine-side active rectifier, and further wherein the machine-side control unit controls the machine-side active rectifier, and the grid-side control unit controls llthell a grid-side inverter of the grid-side converter.

14. The device of claim 1, wherein the machine-side converter outputs pulse currents to the three-phase stator winding of the three-phase PMSG so as to generate another pulse magnetic field in the first-phase, second-phase and third-phase stator windings of the three-phase stator winding, the another pulse magnetic field producing a pulse torque.

15. A torsional resonance frequency measuring method applicable to a power equipment with a rotating member, which acquires the torsional resonance frequency of the power equipment through interaction of a machine-side converter and a rotor of a three-phase permanent magnet synchronous generator (PMSG), the method comprising:

(1) establishing a DC link voltage required by the machine-side converter;

(2) outputting orienting currents from the machine-side converter to the three-phase PMSG so as to rotate the rotor to a position aligned with a radial direction of a first-phase stator winding through a magnetic field generated by the orienting currents;

(3) setting the orienting currents outputted from the machine-side converter to zero, and outputting pulse currents from the machine-side converter to the three-phase PMSG so as to generate by the pulse currents a pulse magnetic field with a predetermined angle, thereby producing a pulse torque for mechanically exciting the rotor; and (4) acquiring back electromotive force generated by the mechanically excited rotor and calculating a torsional resonance frequency of the power equipment with the rotating member according to a frequency spectrum of the back electromotive force;

wherein the orienting currents are output so that a current of the first-phase stator winding is $I_{dc}$, a current of a second-phase stator winding is $-0.5 \cdot I_{dc}$, a current of a third-phase stator winding is $-0.5 \cdot I_{dc}$, wherein the pulse currents are output so that the current of the first-phase stator winding is $I_{dc}$, the current of the second-phase stator winding is $-0.5 \cdot I_{dc}$ and the current of the third-phase stator winding is zero, and wherein $I_{dc}$ is determined according to specification of the three-phase PMSG.

16. The method of claim 15, wherein the DC link voltage of step (1) is supplied through a grid, a DC power supplier or a battery module.

17. The method of claim 15, wherein step (4) further comprises:

(4-1) calculating the pulse torque generated by the pulse currents;

(4-2) calculating the back electromotive force generated by the mechanically excited rotor and Fast Fourier Transform analyzing the back electromotive force to obtain the frequency spectrum thereof; and (4-3) analyzing the pulse torque and the frequency spectrum to obtain the torsional resonance frequency.

18. The method of claim 17, wherein step (4-2) further comprises acquiring terminal voltages of the first-phase stator winding, the second-phase stator winding and the third-phase stator winding so as to calculate the back electromotive force generated by the mechanically excited rotor.

19. A torsional resonance frequency measuring method applicable to a power equipment with a rotating member to acquire the torsional resonance frequency of the power equipment through interaction of a machine-side converter and a rotor of a three-phase permanent magnet synchronous generator (PMSG), the method comprising:

(1) establishing a DC link voltage required by the machine-side converter to generate orienting currents and pulse currents;

(2) outputting the orienting currents from the machine-side converter to the three-phase PMSG so as to rotate the rotor of the PMSG to a predetermined orientation, wherein step (2) further comprises:

(2-1) outputting the orienting currents to a three-phase stator winding of the three-phase PMSG from the machine-side converter, wherein the orienting currents are output such that a current of a first-phase stator winding is $I_{dc}$, a current of a second-phase stator winding is $-0.5 \cdot I_{dc}$ and a current of a third-phase stator winding is $-0.5 \cdot I_{dc}$; and (2-2) rotating a magnet of the rotor to a position in parallel with a radial direction of the first-phase stator winding, through a magnetic field generated by the orienting currents;

(3) outputting the pulse currents from the machine-side converter to the three-phase PMSG so as to mechanically excite the rotor, wherein the pulse currents are output so that the current of the first-phase stator winding is $I_{dc}$, the current of the second-phase stator winding is $-0.5 \cdot I_{dc}$ and the current of the third-phase stator winding is zero; and (4) acquiring back electromotive force generated by the mechanically excited rotor and calculating a torsional resonance frequency of the power equipment with the rotating member according to a frequency spectrum of the back electromotive force.

\* \* \* \* \*